United States Patent
Liu et al.

(10) Patent No.: US 7,885,450 B2
(45) Date of Patent: Feb. 8, 2011

(54) METHOD FOR CHARACTERIZING TEXTURE OF AREAS WITHIN AN IMAGE CORRESPONDING TO MONETARY BANKNOTES

(75) Inventors: Xu-Hua Liu, Los Angeles, CA (US); Byung-Tae Oh, Los Angeles, CA (US); Young-Min Kwak, Gardena, CA (US); Chung-Chieh Kuo, Taipei (TW); Ying-Jieh Huang, Taipei County (TW)

(73) Assignee: Primax Electronics Ltd., Neihu, Taipei (TW)

( * ) Notice: Subject to any disclaimer, the term of this patent is extended or adjusted under 35 U.S.C. 154(b) by 1038 days.

(21) Appl. No.: 11/533,369

(22) Filed: Sep. 20, 2006

(65) Prior Publication Data

US 2008/0069424 A1    Mar. 20, 2008

(51) Int. Cl.
*G06K 9/00* (2006.01)
(52) U.S. Cl. .......................... 382/135; 382/173
(58) Field of Classification Search ......... 382/135–138, 382/165, 190, 141; 358/2.1, 2.99
See application file for complete search history.

(56) References Cited

U.S. PATENT DOCUMENTS

| | | | |
|---|---|---|---|
| 5,533,144 A | 7/1996 | Fan | |
| 5,638,496 A | 6/1997 | Sato | |
| 6,026,186 A | 2/2000 | Fan | |
| 6,067,374 A | 5/2000 | Fan et al. | |
| 6,181,813 B1 | 1/2001 | Fan et al. | |
| 6,256,412 B1 | 7/2001 | Miyazawa et al. | |
| 6,317,524 B1 | 11/2001 | Wu et al. | |
| 6,343,204 B1 | 1/2002 | Yang | |
| 6,473,202 B1 * | 10/2002 | Kanata et al. | 358/2.1 |
| 6,515,764 B1 | 2/2003 | Knox et al. | |
| 6,516,078 B1 | 2/2003 | Yang et al. | |
| 6,542,629 B1 | 4/2003 | Wu et al. | |
| 6,574,366 B1 | 6/2003 | Fan | |
| 6,580,820 B1 | 6/2003 | Fan | |
| 6,731,784 B2 | 5/2004 | Yang | |
| RE38,716 E * | 3/2005 | Caspi et al. | 382/141 |
| 2002/0146167 A1 | 10/2002 | Imamura | |
| 2004/0247169 A1 * | 12/2004 | Ross et al. | 382/137 |
| 2005/0100204 A1 * | 5/2005 | Afzal et al. | 382/135 |

* cited by examiner

*Primary Examiner*—Vu Le
*Assistant Examiner*—Claire Wang
(74) *Attorney, Agent, or Firm*—Winston Hsu; Scott Margo (57) ABSTRACT

A method for characterizing texture of areas within an image corresponding to monetary banknotes includes dividing the image into a plurality of sections; calculating a gray level for each section; selecting potential sections from the sections, the potential sections having gray levels within a predetermined range; selecting bill sections from the potential sections, the bill sections having pixels within a predefined color range and a predefined continuous color gradient range; generating a binary edge map according to gray levels of pixels within the bill sections; and calculating a texture value for each bill section according to the binary edge map.

10 Claims, 9 Drawing Sheets

METHOD FOR CHARACTERIZING TEXTURE OF AREAS WITHIN AN IMAGE CORRESPONDING TO MONETARY BANKNOTES

BACKGROUND OF THE INVENTION

1. Field of the Invention

The present invention relates to image characterization, more particularly, to a method for characterizing texture of areas within an image corresponding to monetary banknotes

2. Description of the Prior Art

The proliferation of image processing systems in recent years, including digital color copiers, scanners, and small scale printing apparatuses, has lead to wide scale use of reproduction of color images and photography. Although mostly used for professional or personal recreation, criminals often try to profit from such equipment through reproduction of currencies, stocks, checks, legal documents, and other documents that are not intended to be reproduced. Due to the existence of such illegal and counterfeit items, there is a need for a method to effectively and quickly characterize and detect illegitimately published currency. This task becomes increasingly more difficult however, as advancements in printing and reproduction quality allow for copies to be made that are virtually indistinguishable to the human eye.

In addition to the increasing difficulties in identifying legitimate currency bills, is the desire to scan sample currencies from images that are larger than the sample currency being scanned. Doing this will allow a bill to be scanned with any common scanner, while possibly allowing the scanning and identification of multiple bills at once. However, doing this introduces more problems as the bills may be presented on arbitrary backgrounds, and may have variations in shift and rotation. Many currency detectors today generally only scan one bill at a time, and only scan the immediate area of the bill in order to omit the need to consider the background, rotation, and alignment of the bill.

Additionally, if the note is scanned while embedded with a complicated image background, it may be very difficult to distinguish the actual note from the image background. The image background may also provide additional noise and/or patterns to complicate the detection process and introduce irregularities and errors.

SUMMARY OF THE INVENTION

One objective of the claimed invention is therefore to provide a method of characterizing texture of areas within an image that correspond to monetary banknotes, to solve the above-mentioned problems.

According to an exemplary embodiment of the claimed invention, a method for characterizing texture of areas within an image corresponding to monetary banknotes is disclosed. The method comprises dividing the image into a plurality of sections; calculating a gray level for each section; selecting potential sections from the sections, the potential sections having gray levels within a predetermined range; selecting bill sections from the potential sections, the bill sections having pixels within a predefined color range and a predefined continuous color gradient range; generating a binary edge map according to gray levels of pixels within the bill sections; and calculating a texture value for each bill section according to the binary edge map.

These and other objectives of the present invention will no doubt become obvious to those of ordinary skill in the art after reading the following detailed description of the preferred embodiment that is illustrated in the various figures and drawings.

DETAILED DESCRIPTION

Proper characterization of currency is critical for ensuring validity of currency received, and reducing the possibility of fraud and monetary losses. Proper characterization of currency in a shift and rotational invariant manner would further add flexibility and convenience to the solution, allowing it to be applied to several conditions and hardware apparatuses.

The present invention therefore provides a texture characterization method for areas corresponding to monetary banknotes within an image to solve the above-described problem. The method can be applied for use in the detection of counterfeit currency. In one embodiment, the image is received from a scan containing a monetary banknote of a known currency type. This can include, but is not limited to U.S.A. denominations and Japanese denomination bills. With a proper texture characterization of the image scan performed, the determined value can be compared with a known standard for a desired currency reference. This can be used to deduce the authenticity of the banknote scanned.

The image can also be provided with an arbitrary rotational axis and shift alignment, as the method is not based upon on a fixed axis during characterization. Additionally, the image can contain the monetary banknotes superimposed onto an arbitrary background, include multiple isolated or independent banknotes, or have overlapping banknotes within the image. The method can be used in conjunction with personal scanners, copiers, stand-alone printers, and other related scanning or detection hardware.

The texture characterization method described in this present invention utilizes innovative and unique combinations of texture extracting techniques, in order to effectively and efficiently determine the presence of counterfeit or copied currency. Multiple levels of texture processing, edge processing, and gray level analysis are incorporated in this multifaceted approach. Accurate detection rates, and low false alarm rates are therefore be attained. The method is also robust and flexible enough to be applied to a wide range of image types and conditions. Not only is an increased means of security provided, but flexibility, and use of integration with common hardware devices is possible. Additionally, the method provides a low cost solution for an essential problem.

Prior to a concise description of the present invention texture processing method, it is important to understand that certain terms used throughout the following description and claims will refer to particular processes or steps. As one skilled in the art will appreciate, designers may refer to such processes by different names. This document does not intend to distinguish between items that differ in name but not function. In the following discussion and in the claims, the terms "including" and "comprising" are used in an open-ended fashion, and thus should be interpreted to mean "including, but not limited to . . . ". Also, the terms "currency", "banknote", and "bills" can be equally used in reference to each other.

Figure 1:
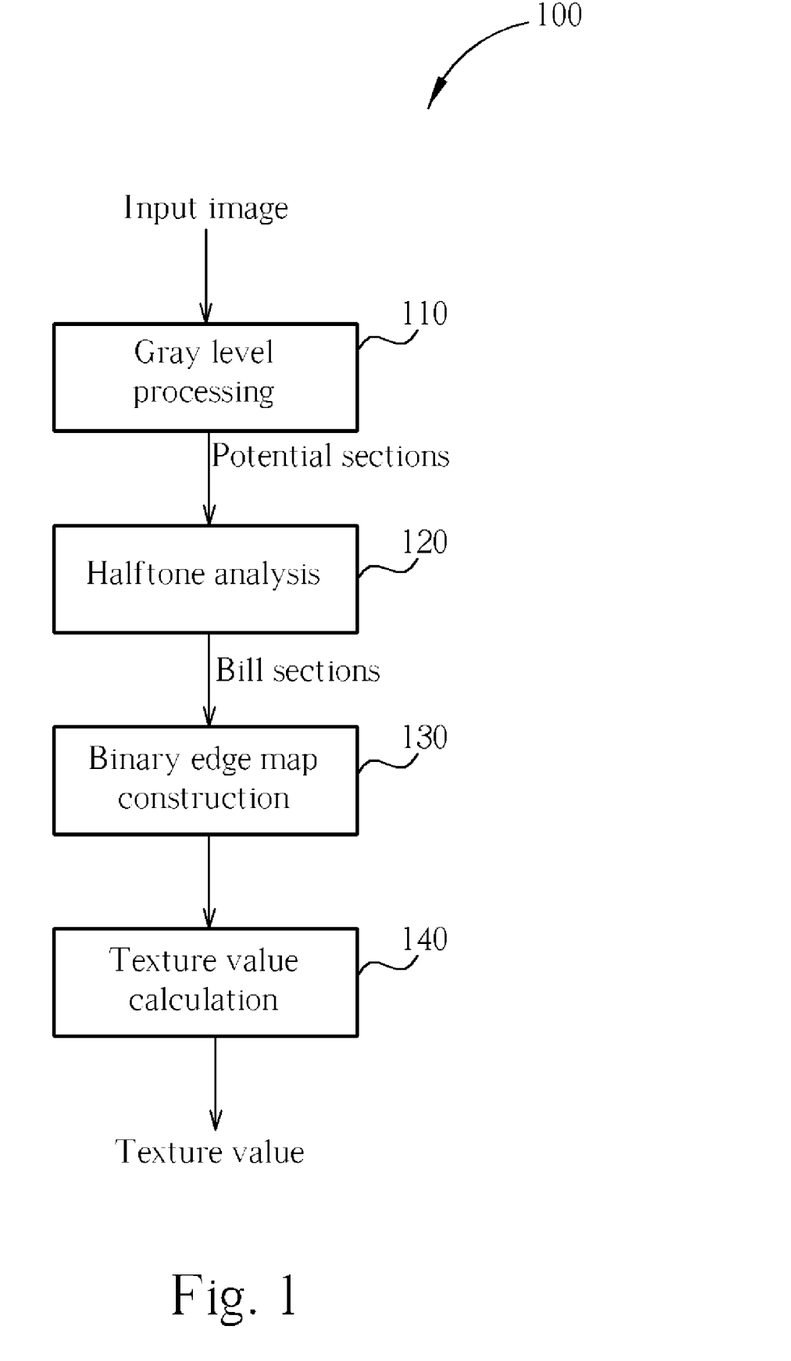
FIG. 1 illustrates a method for characterizing the texture of areas within an image corresponding to monetary banknotes according to an exemplary embodiment of the present invention.

A description of a texture characterizing method according to an exemplary embodiment of the present invention is provided below with reference to FIG. 1. FIG. 1 illustrates a basic outline of the method for characterizing the texture of areas within an image corresponding to monetary banknotes. The method begins by receiving a scanned image, which may or may not include a monetary banknote. The image is divided upon into sections, from which gray level processing 110 is performed. After gray level processing 110, sections having gray levels (also called gray level diversities from hereon forward) within a predetermined range are selected as potential sections, from which halftone analysis 120 is performed. The halftone analysis 120 checks potential sections in the image for halftone printing patterns. The potential sections which do not have halftone printing patterns are then selected as bill sections. The bill sections are then further checked to construct their edge maps in the Binary edge map construction 130 process. The texture value calculation 140 step then uses the binary edge map to determine the texture value. The exact representation of the texture value may vary according to different embodiments of the present invention. In one embodiment of the invention, the texture is a zero crossing rate (i.e. the changing frequency from 0 to 1 and from 1 to 0). The exact mathematical representation of the texture value is intermediate, and can vary so long as the teachings of the present invention remain intact. The above texture descriptors jointly characterize texture of areas within an image corresponding to monetary banknotes. Further discussion regarding each specific process step is detailed below.

Figure 8:
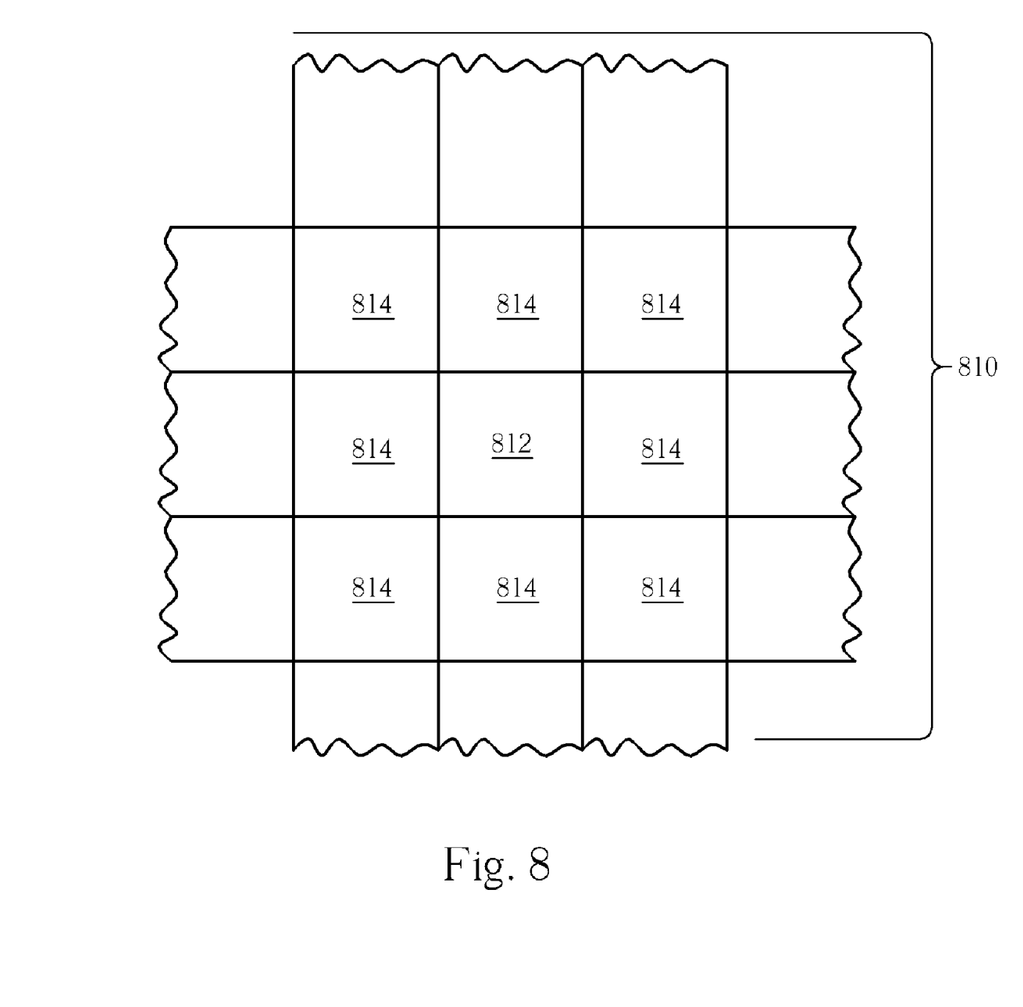
FIG. 8 illustrates a plurality of sections being a plurality of blocks arranged in a grid-like manner according to an exemplary embodiment of the present invention.
Figure 9:
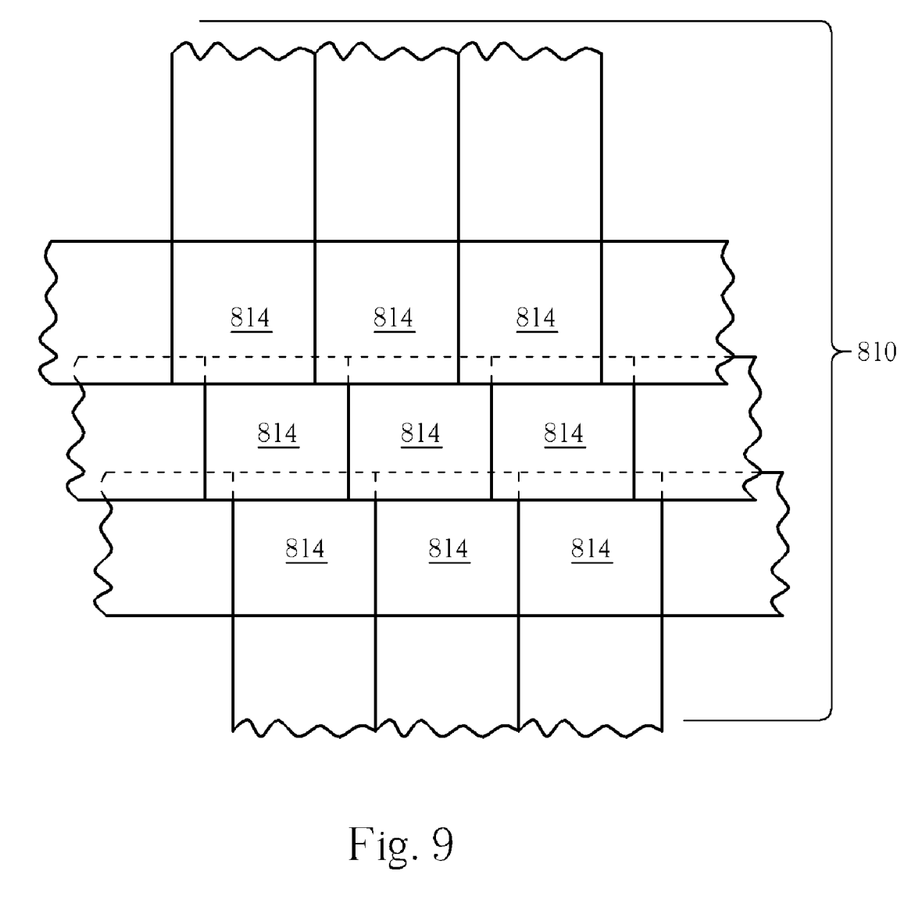
FIG. 9 illustrates a plurality of sections being implemented as overlapping blocks in order to provide a higher resolution of test sections in the texture characterization step according to an exemplary embodiment of the present invention.

A scanned image is typically received from a scanner, or a related hardware imaging device, from which the input image is separated into sections. As illustrated in FIG. 8, in one embodiment, a plurality of sections 810 are in fact a plurality of blocks 814 arranged in a grid-like manner. However, other embodiments may employ different geometric shapes, which serve the equal purpose of dividing the image for initial macroscopic examination. The sections may also be isolated, fitted, overlapping, or disjoint. For example, as illustrated in FIG. 9, the sections 810 are implemented as overlapping blocks 814 in order to provide a higher resolution of test sections in the texture characterization method. In general, the present invention is not limited to the shape, format or precise configuration of the plurality sections used, as it is equally applicable in all combinations and permutations.

Figure 2:
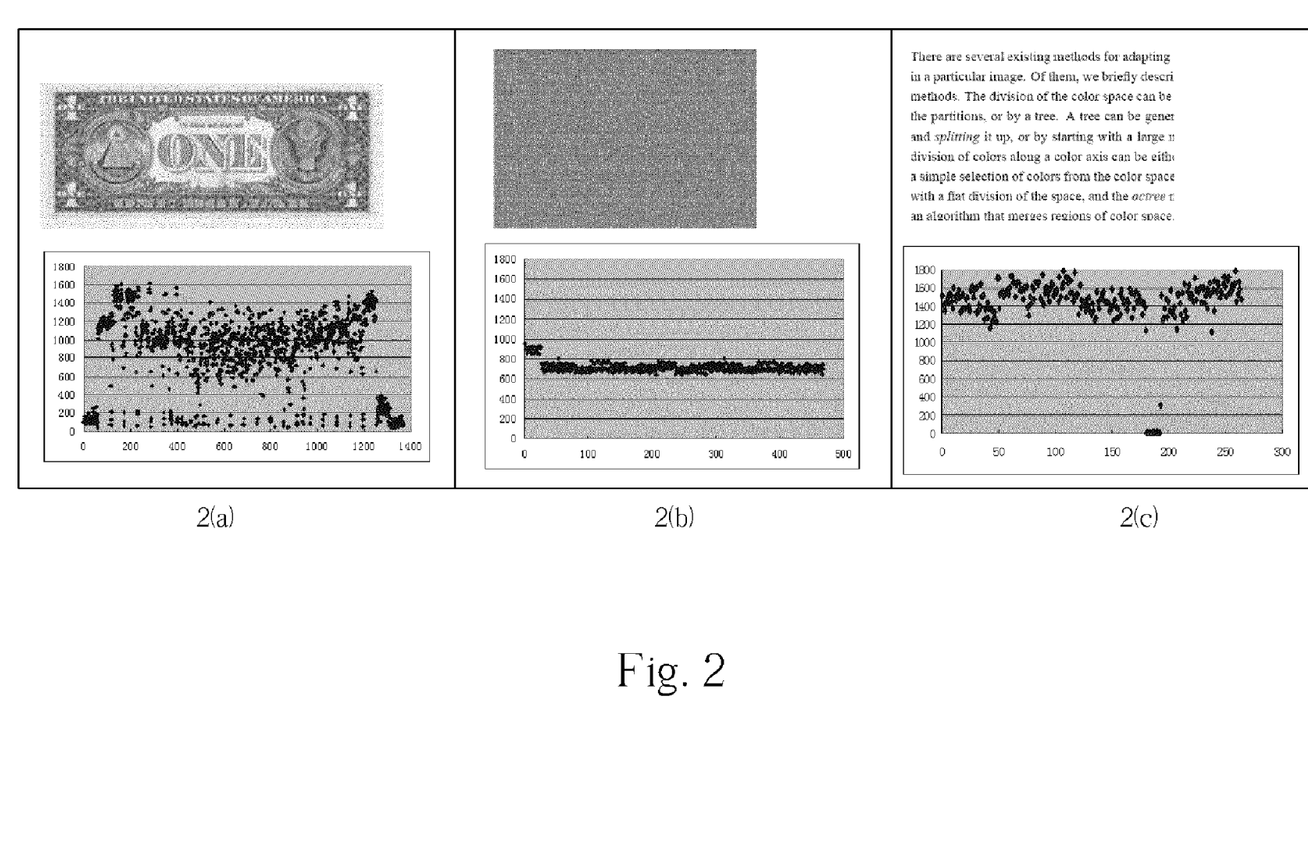
FIG. 2 is an example illustrating gray level variance charts for various objects utilizing the method of FIG. 1.

The first process step involves gray level processing 110. As the scanned image is typically in a color format, it is converted into grayscale to perform initial texture characterization. It is understood that monetary banknotes have a gray level variance within a specific predetermined range. FIG. 2 is an example illustrating gray level variance charts for various objects. FIG. 2(a) shows the gray level variance for a US denomination banknote, while FIG. 2(b) shows the gray level variance for a piece of fabric, and FIG. 2(c) illustrates the gray level for black on white text. As the examples in FIG. 2 shows, every item tends to have a specific range of gray level variance. The fabric shown in FIG. 2(b) tends to have less variance as it has a more uniform grayscale distribution. The black on white text in FIG. 2(c) has a greater variance due to alternating dark text areas, and the white background. The monetary banknote in FIG. 2(a) has the widest grayscale variance among the three objects due to the different shades of gray inherent in the banknote. It is this characteristic that is exploited in gray level processing 110 to determine areas in the scanned image corresponding to a grayscale variance of a known monetary banknote.

Gray level processing 110 determines a gray level diversity (described gray level from hereon) for each divided section of the scanned image. The gray level of each section is then compared with a predetermined range corresponding to a desired monetary banknote. If the compared section is within the predetermined range, it is selected as a potential section. A comparison is performed for every section to fully determine any possible potential section(s).

Figure 3:
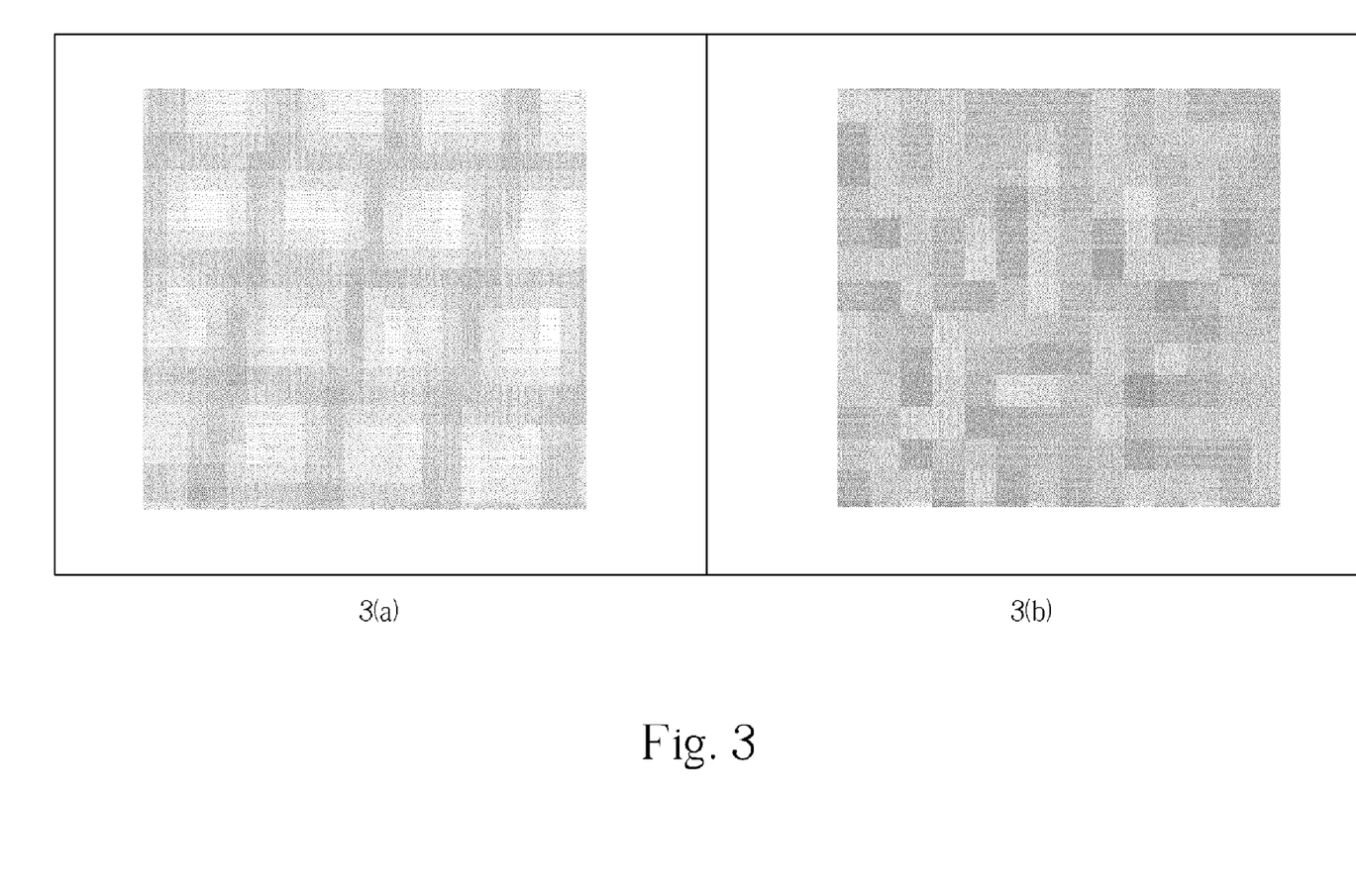
FIG. 3 is an example illustrating an image using halftone mode printing and bill printing utilizing the method of FIG. 1.

Potential sections are then subjected to halftone analysis 120 in order to distinguish halftone patterns. The halftone analysis 120 step is used to distinguish potential sections having a predefined color range, and a predefined continuous color gradient range. Halftone patterns are those with few or no neighbors in the same range of color Hue (U,V) in YUV space or (Cb,Cr) in YCbCr space. This is also known has halftone mode printing. FIG. 3 is an example illustrating an image using halftone mode printing (FIG. 3(b)) and typical bill printing (FIG. 3(a)). The bill printed image in FIG. 3(a) shows a more continuous color gradient in a straight line, as any given pixel has surrounding pixels with the same or similar color tones. The halftone mode image in FIG. 3(b) appears more disjoint, and has a greater variance in color and color continuity. Pixels in halftone images do not generally have surrounding pixels with similar color tones, and therefore do not have a continuous color gradient. In this step, potential sections that are printed in the halftone mode are omitted from further process steps, as they do not correspond to monetary banknotes. The potential sections having a predefined color range, and a predefined continuous color gradient range corresponding to a desired monetary banknote are then selected as bill sections for further processing.

The halftone analysis 120 step described above, where bill sections are selected from potential sections having pixels within the predefined color range and the predefined continuous color gradient range, can also be performed according to a halftone detection algorithm. Alternatively, this step can include determining pixels with similar color according to a YUV color domain of the pixels. As halftone analysis methods are well known to those involved in the related art, further discussion is hence omitted for brevity.

Figure 4:
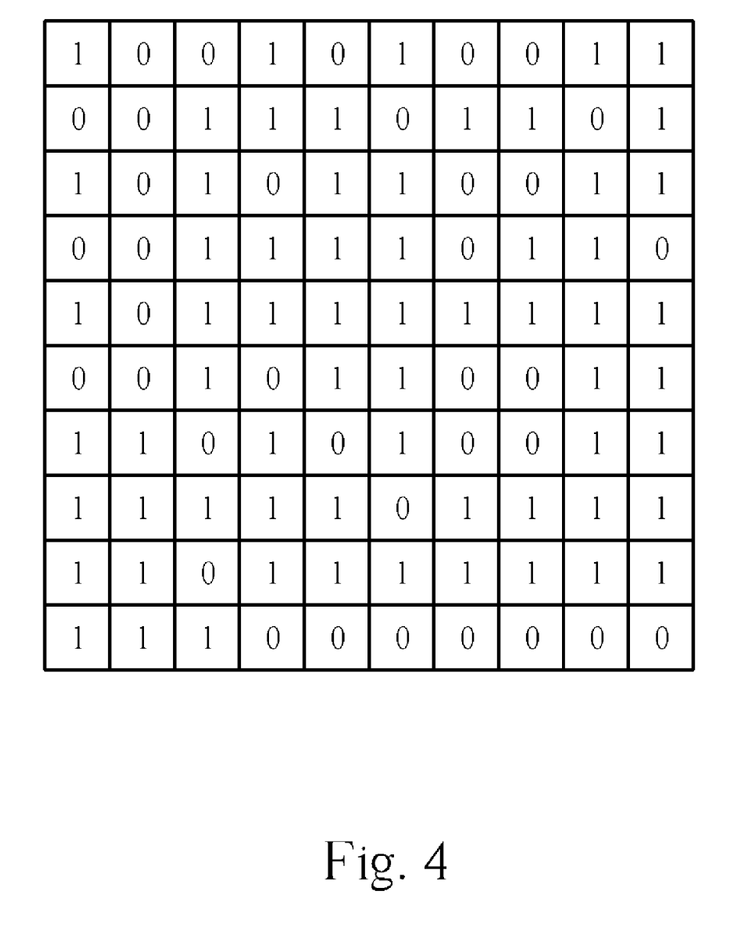
FIG. 4 illustrates an exemplary embodiment of the binary edge map according to the present invention.
Figure 5:
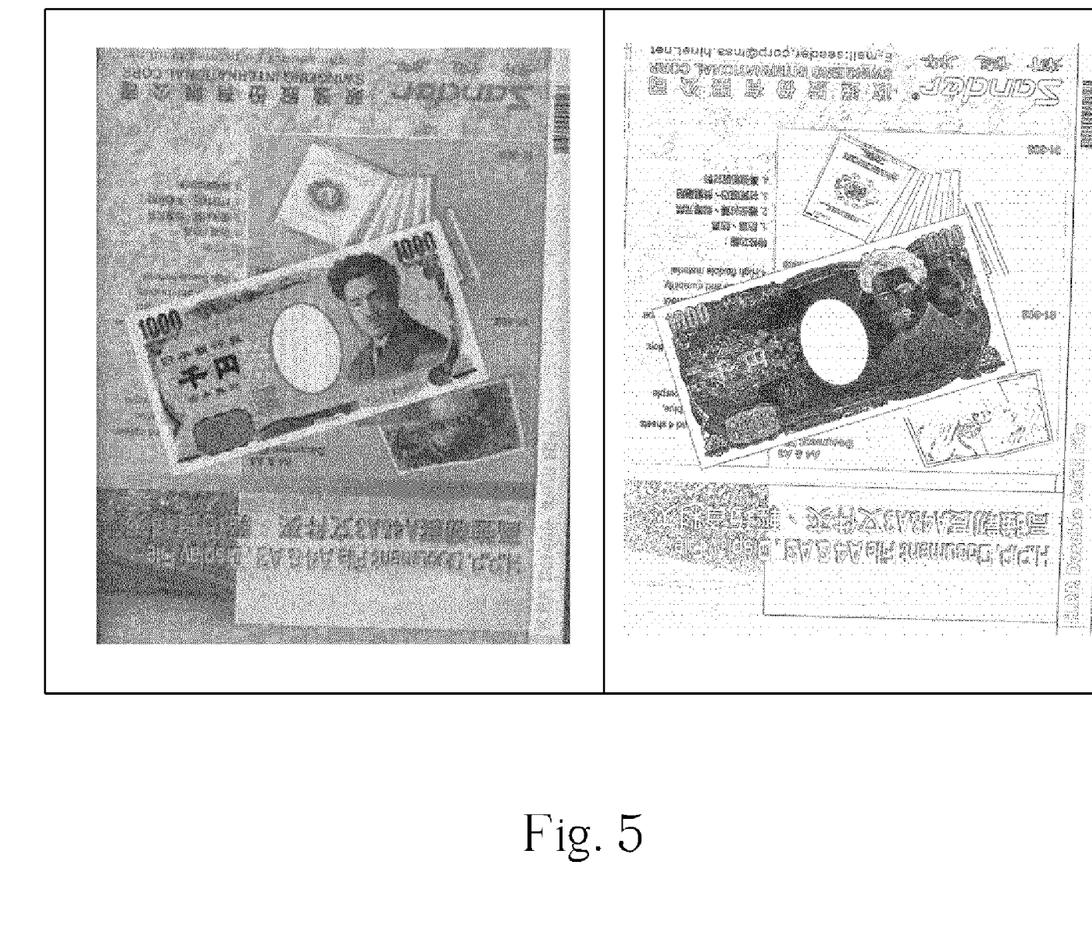
FIG. 5 shows another embodiment of the binary edge map according to the present invention.

With bill sections now determined, a binary edge map can be constructed from the binary edge map construction 130 section. The binary edge map is generally a two level (or two tone) representation based on the gray level gradient of the scanned image. In certain embodiments, it is the gradient in a 3×3 gray block (in YUV domain, using Y channel). The pixels within bill sections are assigned with one of two values. More precisely, gray level gradients of pixels within bill sections are compared to a predetermined threshold level. If the gray level gradient of the pixel is greater than the predetermined threshold, it is assigned a first value. If the gray level gradient of the pixel is lower than the predetermined threshold, it is assigned the second value. Values for all pixels are assigned and subsequently mapped onto a binary edge map. FIG. 4 illustrates an exemplary embodiment of the binary edge map. A 10×10 bill section is shown, containing 100 total pixels. In this example, if the gray level gradient of the pixel surpasses the predetermined threshold, it is assigned a "1" value. Otherwise, it is assigned a "0". FIG. 5 shows another embodiment of the binary edge map, where a Sobel filter is applied. The first value takes a black tone and the second value is white, allowing for a more visual representation of the binary edge map. As shown in FIG. 5, the banknote is very prominent when compared against the background.

With a two value representation of the scanned image deduced through the binary edge map, calculation of the texture value can commence during the texture value calculation 140 process. The texture value calculation 140 utilizes section based zero-crossing frequencies to determine the texture value. As the texture of banknotes tends to be very fine, one way to characterize it is to determine the number of edges when traversing the binary edge map. In other words, when traversing a bill section in the binary edge map, a frequency of transitions from a first value to a second (second value to a first) is counted. To get a higher resolution for the texture value, a total of four different frequencies in four directions are attained: a first frequency of alternating of values in a first direction of the binary edge map, a second frequency in a second direction, a third frequency in a third direction, and a fourth frequency in a fourth direction.

Again, the exact representation of the texture value may vary according to different embodiments of the present invention. One embodiment of the present invention utilizes a zero crossing rate as the texture value. The exact mathematical representation of the texture value is intermediate, and can vary so long as the teachings of the present invention remain intact (i.e. the texture value calculation 140 utilizing section based zero-crossing frequencies to determine the texture value).

Figure 6:
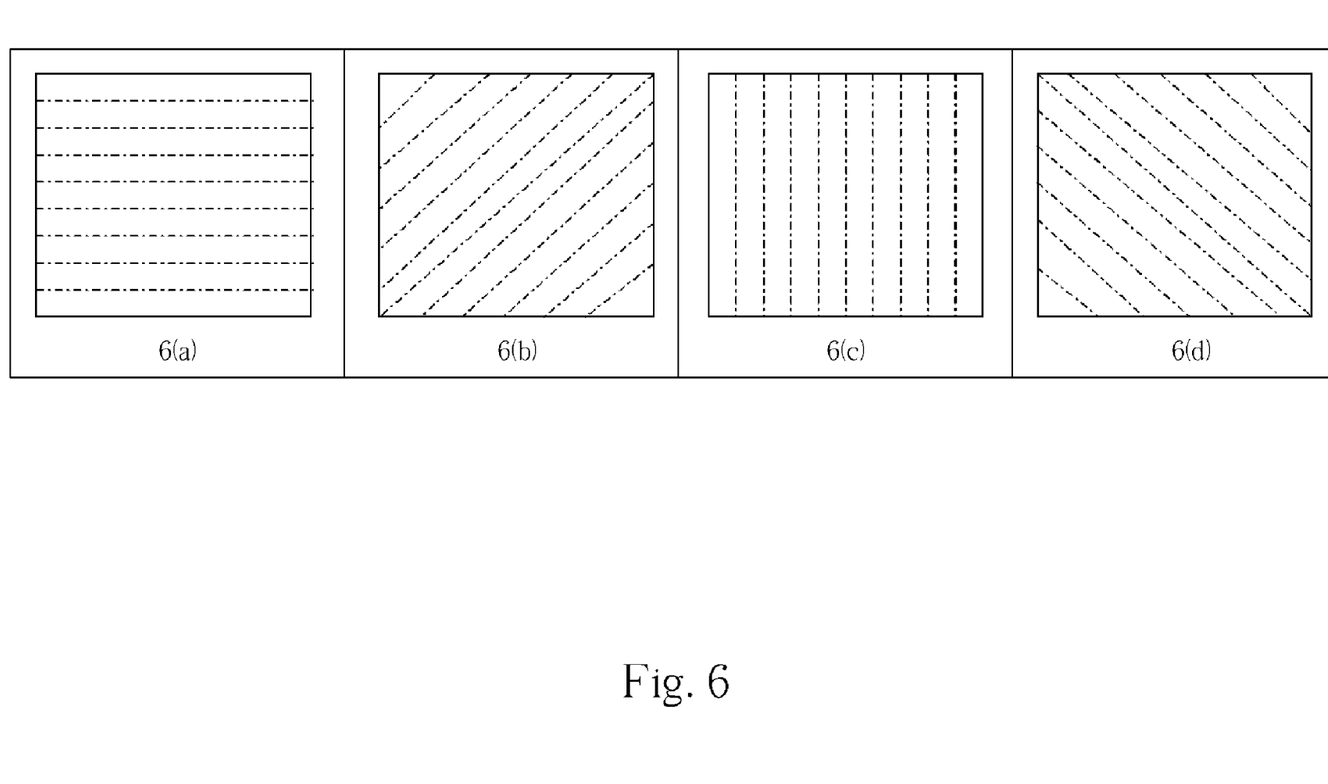
FIG. 6 shows an exemplary illustration of traversing the binary edge map in four directions according to the present invention.

FIG. 6 shows an exemplary illustration of traversing the binary edge map to determine the first, second, third, and fourth frequencies of alternating values, each in different direction. In FIG. 6(a) the first direction is shown at 0 degrees, in 6(b) the second direction is shown at 45 degrees, in 6(c) the third direction is shown at 90 degrees, and in 6(d) it is shown at 135 degrees. Upon obtaining the first, second, third, and fourth frequencies, the texture value can be calculated accordingly for each bill section. Preferably, the texture value is calculated according to a maximum frequency, a minimum frequency, and a difference between the maximum frequency and the minimum frequency for each of the first frequency, the second frequency, the third frequency, and the fourth frequency.

With the texture value now calculated for each bill section, it can be compared with a predetermined reference of a desired monetary banknote. This is used to determine the legitimacy and authenticity of the bill. The predetermined reference is based on the actual desired monetary banknote to be detected, and provides a range of acceptable texture values that fall within an acceptable tolerance of accuracy. If the texture value of the bill section falls within the range of the predetermined reference, then the corresponding bill section can be assumed as authentic. Otherwise, if the texture value of the bill section does not fall within the range of the predetermined reference, the texture of the bill section cannot be confirmed as the desired banknote.

Figure 7:
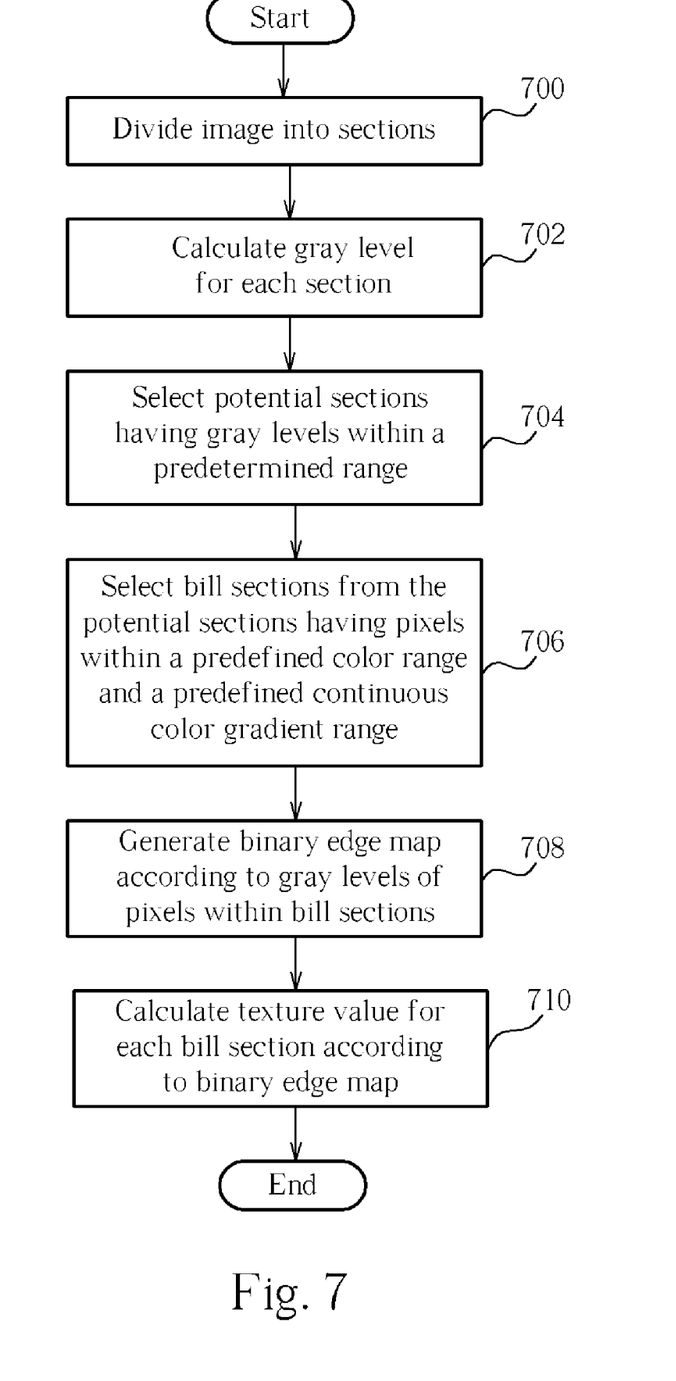
FIG. 7 is a process flow chart summarizing a method for characterizing texture of areas within an image corresponding to monetary banknotes according to an exemplary embodiment of the present invention.

FIG. 7 is a process flow chart summarizing a method for characterizing texture of areas within an image corresponding to monetary banknotes according to an exemplary embodiment of the present invention. Provided that substantially the same result is achieved, the steps of process 700 need not be in the exact order shown and need not be contiguous, that is, other steps can be intermediate. The method comprises:

Step 700: Divide the image into a plurality of sections.

Step 702: Calculate a gray level for each section.

Step 704: Select potential sections from the sections, the potential sections having gray levels within a predetermined range.

Step 706: Select bill sections from the potential sections, the bill sections having pixels within a predefined color range and a predefined continuous color gradient range.

Step 708: Generate a binary edge map according to gray level gradients of pixels within the bill sections.

Step 710: Calculate a texture value for each bill section according to the binary edge map.

Therefore, by applying the present invention method above, a texture characterization method for areas within an image corresponding to monetary banknotes is provided. By properly and accurately characterizing an image corresponding to a monetary banknote, counterfeit and illegal currencies can be distinguished from legitimate currencies. A calculated texture value can be compared with a known standard for of a desired currency reference to deduce the authenticity of the banknote scanned.

The different levels of texture processing steps successively narrow down different sections as potential candidates corresponding to monetary currency. A more efficient and economical process is achieved because texture values are only calculated for remaining sections. This allows for accurate detection rates and low false alarm rates, while also being robust and flexible enough to be applied to a wide range of image types and conditions.

A scanned input image can be provided with an arbitrary rotational axis and shift alignment, as the method is not based upon on a fixed axis during characterization. Additionally, the image can contain the monetary banknotes superimposed onto an arbitrary background, include multiple isolated or independent banknotes, or have overlapping banknotes within the image. The method also provides a low cost solution, as it can be used in conjunction with personal scanners, copiers, stand-alone printers, and other related scanning or detection hardware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for characterizing texture of areas within an image corresponding to monetary banknotes to determine legitimacy and authenticity of the monetary banknotes, the method comprising:

dividing the image into a plurality of sections;

calculating a gray level variance for each section by a hardware imaging device;

selecting potential sections from the sections, the potential sections having gray level variances within a predetermined range;

selecting bill sections from the potential sections, the bill sections having pixels within a predefined color range and a predefined continuous color gradient range;

generating a binary edge map according to gray level gradients of pixels within the bill sections;

calculating a texture value for each bill section according to the binary edge map; and determining the legitimacy and authenticity of the monetary banknotes by comparing the texture value for each bill section with a predetermined reference of a desired monetary banknote.

2. The method of claim 1 wherein generating the binary edge map further comprises:

determining gray level gradients for pixels within bill sections;

comparing the gray level gradients of pixels within the bill sections to a predetermined threshold level;

assigning pixels with gray level gradients greater than the predetermined threshold to a first value;

assigning pixels with gray level gradients lower than the predetermined threshold to a second value; and mapping the assigned first and second values of the pixels onto the binary edge map.

3. The method of claim 1 further comprising utilizing a Sobel filter to generate the binary edge map.

4. The method of claim 1 wherein calculating the texture value for each bill section according to the binary edge map further comprises:

determining a first frequency of alternating of values in a first direction of the binary edge map;

determining a second frequency of alternating of values in a second direction of the binary edge map;

determining a third frequency of alternating of values in a third direction of the binary edge map;

determining a fourth frequency of alternating values in a fourth direction of the binary edge map; and calculating the texture value according to the first frequency, the second frequency, the third frequency, and the fourth frequency.

5. The method of claim 4 further comprising calculating the texture value according to a maximum frequency, a minimum frequency, and a difference between the maximum frequency and the minimum frequency for each of the first frequency, the second frequency, the third frequency, and the fourth frequency.

6. The method of claim 1 wherein the plurality of sections are a plurality of blocks.

7. The method of claim 1 wherein sections of the plurality of sections are overlapping sections.

8. The method of claim 1 wherein the step of selecting the bill sections from the potential sections having pixels within the predefined color range and the predefined continuous color gradient range further comprises utilizing a halftone detection algorithm.

9. The method of claim 1 wherein the step of the selecting bill sections from the potential sections having pixels within the predefined color range and the predefined continuous color gradient range further comprises determining pixels with a similar color hue according to a YUV color domain of the pixels.

10. The method of claim 1 wherein the step of the selecting bill sections from the potential sections having pixels within the predefined color range and the predefined continuous color gradient range further comprises determining pixels with a similar color hue according to a YCbCr color domain of the pixels.

* * * * *